United States Patent
Kapilevich

(10) Patent No.: US 10,477,382 B1
(45) Date of Patent: Nov. 12, 2019

(54) ATTRIBUTING ONLINE ACTIVITIES TO INTERNET PROTOCOL ADDRESSES OF ROUTERS FOR CUSTOMIZING CONTENT TO DIFFERENT NETWORKS

(71) Applicant: Adobe Inc., San Jose, CA (US)

(72) Inventor: Matvey Kapilevich, Irvington, NY (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/956,603

(22) Filed: Apr. 18, 2018

(51) Int. Cl.
*H04W 8/00* (2009.01)
*H04L 12/24* (2006.01)
*H04L 29/12* (2006.01)
*G06F 16/335* (2019.01)

(52) U.S. Cl.
CPC .......... *H04W 8/005* (2013.01); *G06F 16/337* (2019.01); *H04L 41/085* (2013.01); *H04L 61/6068* (2013.01)

(58) Field of Classification Search
None
See application file for complete search history.

(56) References Cited

U.S. PATENT DOCUMENTS

| | | | |
|---|---|---|---|
| 2002/0009073 A1* | 1/2002 | Furukawa | H04L 29/06 370/352 |
| 2003/0120766 A1* | 6/2003 | Ishiyama | H04L 12/2856 709/223 |
| 2014/0022942 A1* | 1/2014 | Han | H04L 41/0803 370/254 |
| 2017/0093790 A1* | 3/2017 | Banerjee | H04L 61/2007 |
| 2017/0230256 A1* | 8/2017 | Urbach | H04L 41/50 |
| 2017/0317969 A1* | 11/2017 | Masurekar | H04L 61/2015 |
| 2019/0020580 A1* | 1/2019 | Boutros | H04L 45/42 |

* cited by examiner

*Primary Examiner* — Ajit Patel
(74) *Attorney, Agent, or Firm* — Kilpatrick Townsend & Stockton LLP

(57) ABSTRACT

Certain embodiments involve associating a device with an identifier of a router that is assigned an IP address based on DHCP. For example, connection data that includes the IP address is analyzed to associate devices with the identifier of the router. A determination is made as to whether any usage of the IP address by the devices overlap in time. Devices with overlapping usage are determined to be connecting to online resources via a same router, while devices with non-overlapping usage are determined to be connecting from other routers. A single router identifier is associated with the devices using the same router. This identifier is then used to track the online activity of the associated devices.

20 Claims, 8 Drawing Sheets

ATTRIBUTING ONLINE ACTIVITIES TO INTERNET PROTOCOL ADDRESSES OF ROUTERS FOR CUSTOMIZING CONTENT TO DIFFERENT NETWORKS

TECHNICAL FIELD

This disclosure relates generally to computer networking. More specifically, but not by way of limitation, this disclosure involves accurately attributing online activities to internet protocol addresses of routers, which can facilitate effective customization of content to different networks that include these routers.

BACKGROUND

A local area network (LAN) generally includes a router and a set of user devices. The router manages access of the user devices to online resources (e.g., web sites) by assigning local internet protocol (IP) addresses to the user devices and by translating between these local IP addresses and the router's own IP address. For example, a user device requests and receives content from a web site via the router. In particular, the router replaces the user device's local IP address in the request with the router's IP address, and sends the request to a web server hosting the web site. Upon a response including the content from the web server, the router replaces the router's IP address with the user device's local address in the response and sends this response to the user device.

Back-end systems can collect traffic data, which includes IP addresses of routers that connect user devices to the Internet, and customize web content based on analyzing this traffic data. Because a router connects different user devices to a website via the Internet, data traffic to the web site shows the IP address of the router, rather than the local IP address of the user device on the LAN. Specifically, the web server receives a request for web content from the IP address of the router and directs a response to the IP address of the router, regardless of which user on the LAN submitted the request. Thus, when back-end systems customize content based on an IP address in web traffic, the back-end systems provide customized content specific to a router's IP address, thereby causing a common online experience to be provided for the user devices on a LAN that includes the router. For instance, when a tablet and a desktop computer of the LAN are operated to access the web site, consistent targeted content can be provided to both the tablet and the desktop computer. However, traditional systems, which rely on customizing content based on an IP address of a LAN's router, present certain disadvantages.

One example of these disadvantages is that traditional back-end systems, which focus on router IP addresses when customizing content, could mistakenly attribute different online activities to a single LAN even though these activities were actually performed via two different LANs. This inaccurate "single network attribution" typically occurs in a computing environment that uses a dynamic host configuration protocol (DHCP). For instance, a first user device on a first LAN accesses online resources via a first router. According to the DHCP protocol, an Internet service provider (ISP) dynamically assigns and changes the IP address of the first router. Often, the IP address currently assigned to the first router may have been previously assigned to a second router providing online access to a second user device on a second LAN. Therefore, the online activities of the two devices belonging to two different LANs would show that the same IP address was used over time. Traditional back-end systems would inaccurately attribute the online activities to devices on the same network because of the same IP address being used by the two different routers. Thus, instead of content on the first router's LAN being customized differently than content on the second router's LAN, the same type of content-customization would mistakenly occur for the user devices across both LANs.

Another example of these disadvantages is that traditional back-end systems also mistakenly attribute certain online activities to a LAN, even though these activities were actually performed by a user device that does not typically use that LAN. This inaccurate "device attribution" typically occurs when a user device travels between locations corresponding to different LANs. For instance, the LAN may correspond to a first user's household and the first user may set this LAN as his or her home network. When a second user visits the household for a short period of time and connects his or her own user device, the resulting online activities of this "visiting" user device also show the IP address of the LAN's router. Thus, if a back-end system customizes web content based on data traffic from that router's IP address, activities of the visiting user device would be mistakenly included in an analysis of "home network" activities, even though the visiting user device was only briefly connected to the LAN. For instance, the back-end system would mistakenly customize content for both the first user, who regularly uses the home network, and the second user, who rarely uses the home network, instead of customizing content to only the first user.

SUMMARY

Certain embodiments involve accurately attributing online activities to different networks, such as local area networks. In an example, a back-end system or other computer system determines, from connection data generated based on an online activity, that an internet protocol (IP) address is used, over different time periods, by a first router of a first network and a second router of a second network. The computer system also determines that a time gap between usage of the IP address by the first router and usage of the IP address by the second router exceeds a threshold. Based on the time gap, the computer system attributes a subset of the online activity originating from the first network to a first router identifier rather than a second router identifier. The first router identifier comprises the IP address and an additional identifier associated with the first router. The second router is associated with a second router identifier corresponding to the network. Further, the computer system analyzes the subset set of the online activity based on the first router identifier.

In a further example, a computer system accesses connection data indicating that (i) a user device identifier is associated with a first internet protocol (IP) address of a first router and (ii) the user device identifier is associated with a second IP address of a second router. The computer system generates, from the connection data, a first score for the first IP address and a second score for the second IP address based on usages, over time, of the first IP address and the second IP address. Based on a comparison of the first score and the second score, the computer system assigns the first IP address as a home IP address for the user device identifier. The computer system also analyzes (i) first online activities originating from the first IP address and including the user device identifier and (ii) second online activities originating from the second IP address and lacking the user device identifier. The analysis of the second online activities involves excluding, based on the first IP address being assigned as the home IP address for the user device identifier, online activities associated with the user device identifier.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
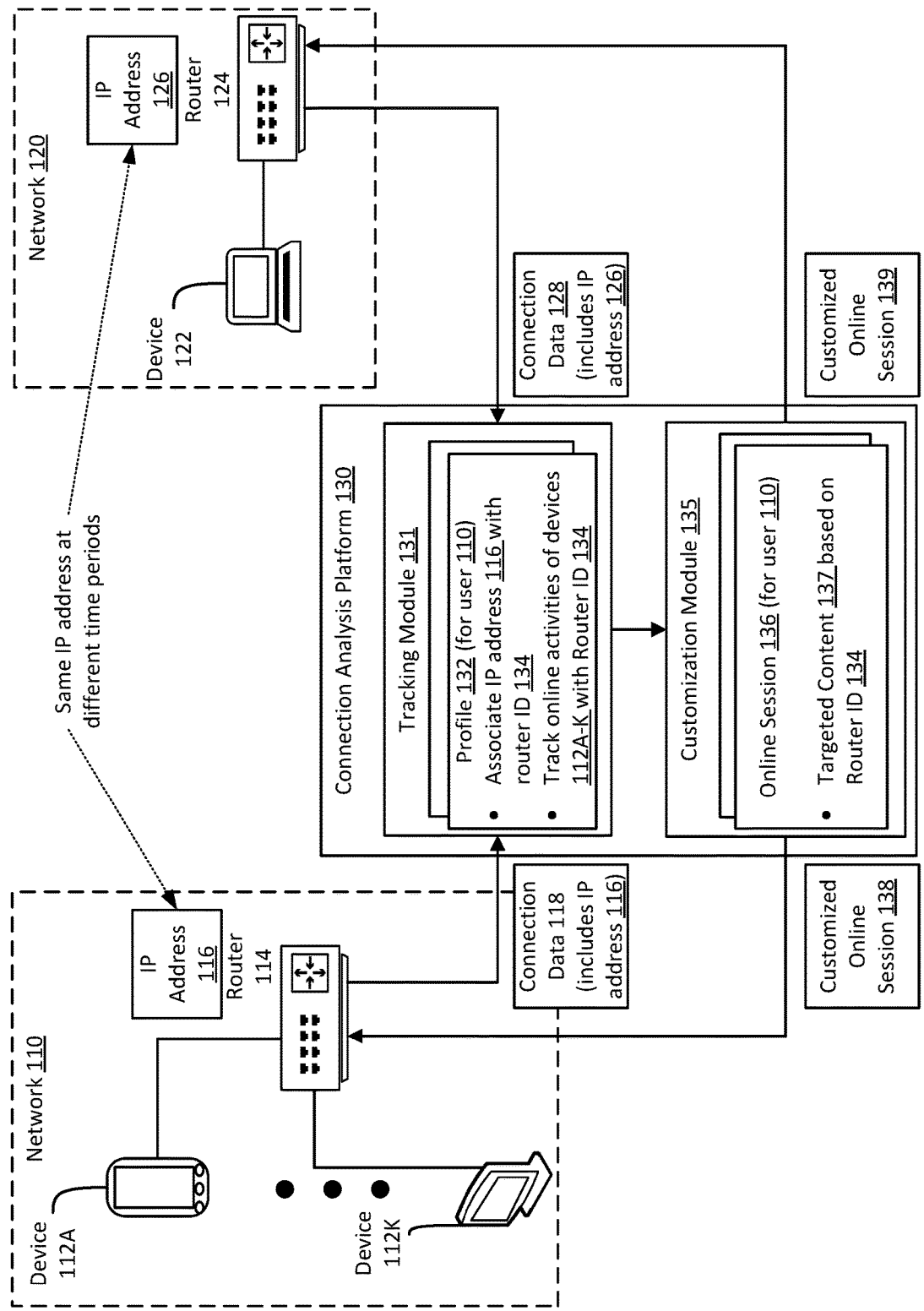
FIG. 1 is a diagram depicting an example of a computing environment for collecting connection data from user devices and associating these user devices with router identifiers, according to embodiments of the present disclosure.

Embodiments of the present disclosure are directed to, among other things, attributing online activities to particular router IP addresses. The proper attribution of online activities to a particular router IP address can allow content to be more effectively customized to a given network (e.g., a LAN) that includes the router. As described in greater detail below, some embodiments address the mistaken "single network attribution" described above based on the timing with which different routers use the same IP address. Other embodiments address the mistaken "device attribution" described above by excluding, from an analysis of online activities originating from a particular LAN (or other network), activities performed by user devices that do not use that particular LAN as a "home" network.

As used herein, the term "user" refers to an end user that operates a device to access an online resource via a router. The term "user device" refers to the device used by the user for the access. The term "router" refers to a networking device that routes network traffic including traffic between a set of user devices and a set of online resources. The router and the set of user devices form a network, such as a LAN. The term "router identifier" refers to an identifier that is unique to the router. The router identifier indicates that the set of user devices accesses the online resources via the router, thereby allowing to attribute online activities of these devices to the network.

As used herein, the term "connection data" refers to information about connections between the set of user devices and the online resources. For the example, this information includes IP addresses, user device identifiers (e.g., media access control (MAC) address, cookies, etc.) timestamps of the connections, time length of each connection, addresses of the online resources, clickstream, and the like.

As used herein, a "home IP address" for a given user device refers to an IP address of a router on a home network, where the home network is a network that is frequently accessed by the user device. In an example, the home network is the most frequently used network among other networks available to the use device.

Some embodiments address the mistaken "single network attribution" described above by distinguishing between routers of different networks that share the same IP address over time and by using router identifiers to attribute the online activities of the user devices to the networks. A given router identifier includes a router's IP address and a synthetic router name (e., "router-1," "router-2," etc.) specific to a particular router. For example, a first user device accesses online resources via a first router of a first network (e.g., a first LAN) during a first time period (e.g., January through March) and a second user device accesses the online resources via a second router of a second network (e.g., a second LAN) during a second time period (e.g., May through September). Furthermore, because DHCP reassigns IP addresses over time, the same IP address could be associated with web traffic involving the first user device during the first time period and web traffic involving the second user device during the second time period.

Continuing with this example, a back-end system that analyzes the web traffic (e.g., web traffic from January through September) uses a time gap between the two time periods to distinguish between web traffic originating from the first router's LAN and web traffic originating from the second router's LAN. In this example, which involves two routers that have the same IP address at two different time periods (January-March and May-September), a time gap exists between March and May during which the IP address was not used. The back-end system identifies determines whether this time gap between the usages of the IP address by the two routers is larger than a predefined time resolution (e.g., a day set as a threshold). If the time gap is large enough (e.g., larger than one day or some other predefined threshold), the back-end system determines that the IP address was reassigned between the two networks that respectively include the two routers.

Accordingly, the back-end system assigns two router identifiers to the two routers, respectively. The first router identifier includes the IP address and a first synthetic router name (e.g., "router-1"), and the second router identifier includes the IP address and a second synthetic router name (e.g., "router-2"). The back-end system attributes the online activities occurring during the first time period to the first router identifier and attributes the online activities occurring during the second time period to the second router identifier.

The back-end system creates (or facilitates the creation of) first customized content based on the online activities attributed to "router-1." Thus, a first user device connected to the first LAN via the first router will receive "router-1" customized content. Similarly, different customized content, which is generated from online activities attributed to the second router identifier, is delivered to the second LAN. Thus, a second user device connected to the second LAN via the second router identifier will receive "router-2" customized content.

Other embodiments address the mistaken "device attribution" described above by limiting an analysis of online activity for a given router's IP address to user devices that use that router's LAN as a "home" network. For instance, a back-end system could analyze connection data showing that online activity is associated with multiple IP addresses, which identity routers that connect user devices to the Internet, and multiple user device identifiers, which are specific to user devices themselves (e.g., cookies, media access control (MAC) addresses, etc.). In one example, this connection data could indicate that the same MAC address (e.g., a particular user device) is associated with online activity originating from a first LAN (e.g., a first router IP address) and a second LAN (e.g., a second router IP address). The back-end system determines which router IP address (i.e., LAN) should be considered the "home IP address" for that MAC address (or other user device identifier). The determination of a router IP address as user device's a "home IP address" is performed based on how frequently the user device with that MAC address access online resources via a router having the router IP address.

Continuing with this example, the back-end system uses this determination of a "home IP address" when customizing content to the two LAN's. A "home IP address" for a given user device is, for example, the IP address of the router that is most frequently used by the user device to access online resources. The designation of a home IP address for a particular user device allows a back-end system to determine whether that user device's activities should contribute to the customization of content to be delivered to a router (i.e., a LAN). In one example, if the first router's IP address is the "home IP address" associated with a particular MAC address (i.e., a particular user device), the back-end system includes activity associated with that MAC address (i.e., particular user device activity) in a content-customization analysis that generates customized content to be delivered to the first router's IP address. Similarly, when customizing content for the second LAN, the back-end system excludes activity associated with that MAC address from a content-customization analysis for the second router's IP address, since the second router's IP address is not considered the "home IP address" for that MAC address. Thus, online activities associated with a particular MAC address (i.e., a user device identifier) only contribute to content customization with respect to that user device's home network.

In this example, the determination of which IP address should be considered a "home IP address" involves multiple connection parameters. These parameters include, for instance, a number of times each IP address is used to access the online resources, a number of connection sessions during which each IP address is used, a length of a span during which each IP address is used, and a usage pattern for each IP address. Connection scores can be generated for each IP address given these parameters. Generally, the more frequently an IP address is used, the longer the use, and the more connection sessions during which it is used, the higher the score is for that IP address. The IP address having the highest score is selected as the home IP address.

The embodiments of the present disclosure provide many technological improvements over the existing solutions. For example, the online activity attribution is more accurate, especially in a computer network that uses DHCP. Unlike the existing solutions that are subject to the "single network attribution," the back-end system herein distinguishes between the online activities across different networks by associating certain online activities the devices with certain router identifiers and using the router identifiers to more accurately analyze the online activities, even when the routers use the same IP address over time. In another example, the analysis is less computationally complex. Because the existing solutions are subject to the "device attribution," these solutions involve inefficiently using multiple IP addresses to inaccurately include activities of a given device across different networks when analyzing the online activities originating from these networks. In comparison, the back-end system herein accurately associates the device with a single home IP address and uses this address in the analysis, thereby reducing the analysis' computational burden.

In turn, the technological improvements to the back-end system further improves the online services that rely on its analysis. For example, when different devices belonging to a same network (e.g., a LAN) access online resources, a common user experience can be provided across these different devices, given than they are associated with a common router identifier. Hence, when a desktop computer of the LAN accesses a website, targeted content related to a particular topic can be inserted in the website for presentation on the desktop computer. Subsequently, when a tablet of the LAN accesses the same or a different website, targeted content that also relates to the particular topic can be inserted, thereby providing consistent information about the topic to the user across the website(s) and the two devices.

FIG. 1 is a diagram depicting an example of a computing environment for collecting connection data from user devices and associating these user devices with router identifiers, according to embodiments of the present disclosure. In an embodiment, the computing environment includes user devices (referred to as devices), each accessing a number of online resources (not shown) via routers. The connection data associated with the access is provided to a connection analysis platform 130 that uses the IP-based tracking of the present disclosure. This platform 130 associates a set of the user devices with a same router identifier based on an IP address identified in the connection data and customizes computing sessions of the user devices when accessing the same or different online resources based on the router identifier.

As illustrated, a user of a network 110 operates multiple devices 112A-112K (e.g., tablets, desktop computers, smartphones, and other end user devices) to access the online resources (e.g., websites, servers, and other computing resources available to the devices 112A-112K over data networks). Each of the devices connects to the online resources via a router 114. The router 114 and the devices 112A-112K form the network 110. Connection data 118 about the connections of these devices 112A-112K with the online resources is tracked by a tracking module 131 of the connection analysis platform 130. This data 118 includes an IP address 116 of the router 114 (e.g., the IP address detected in association with an access to an online resource, referred to herein as an external IP address). Within the subnetwork of the router 114, the router 114 translates this external IP address 116 to a local IP address of the subnetwork unique to each of the devices 112A-112K. However, the local IP addresses are masked from the tracking (e.g., from a collection module 132) and, accordingly, the tracking relies on the external IP address 116. This subnetwork represents the network 110 which is the home network of the user devices 112A-112K. In addition, the connection data 118 includes, for each of the devices 112A-112K an identifier associated with the device (e.g., a MAC address, a browser cookie installed in a web browser of a device, and the like). This device identifier allows the association of the IP address 116 with the corresponding device.

Other users may similarly operate other devices and connect via other routers on other networks. The connection data, IP addresses of these routers, and device identifiers are similarly collected and analyzed by the connection analysis platform 130 to customize the online session of each of such users. As illustrated in FIG. 1, a second user operates a device 122 that connects to the online resources via a second router 124. The second router 124 is on a second network 120 that is the home network of the device 122. The tracked IP address of the device 122 is an IP address 126 of the router 124 (e.g., the external IP address for the subnetwork managed by the router 124). Accordingly, the connection data 126 tracked for the device 122 includes the IP address 126.

Over time, an ISP changes the IP addresses allocated to the routers. In particular, the value of the IP address 116 of the router 114 changes between a first time period and a second time period (e.g., from "56.70.23.12" to "64.82.32.10"). Similarly, the value of the IP address 126 of the router 124 changes between the two time periods. In some instances, the value that was previously used by the router 124 is the new value that the router 114 uses, or vice versa. For example, the "64.82.32.10" for the IP address 116 used by the router 114 in the second time period was previously used by the router 124. To properly track the online activities of the devices 112A-112K and to avoid erroneously associating the device 122 with the first network 110, the connection analysis platform 130 uses a router identifier instead of the actual values of the IP address 116.

As illustrated in FIG. 1, the connection analysis platform 130 implements the tracking module 131 and a customization module 135. Generally, the tracking module 131 collects the connection data 118 of the devices 112A-112K and generates a profile 132 (and, similarly, tracks the connection data 128 of the device 122 and generates a corresponding profile). In an example, the profile includes a user identifier and a router identifier (shown as a router ID 134). The user ID uniquely identifies the user of the network 110 relative to the other users and associate the user with the device identifiers (the profile 133 can also store the device identifiers). The router identifier 134 uniquely identifies the devices 112A-112K. For instance, all the devices 112A-112K are associated with the router identifier 134 and this router identifier 134 is used to track the online activities of the devices 112A-112K instead of the IP address 116. Generally, the tracking module 131 generates the router identifier 134 and associates the IP address 116 received in the connection data 118 with the router identifier 134. Multiple profiles may be generated and maintained, for each one of the users.

In an example, the tracking module 131 implements the IP-based tracking of the present disclosure to generate and store the router identifier 134 in the profile 132. In particular, if any of the devices 112A-112K travels outside the home network 110 (e.g., the subnetwork managed by the router 114), any identified IP address associated with the device outside this home network is filtered out (e.g., all travel IP addresses are filtered out). In an example, the tracking module 132 stores the home IP address in the profile 132, thereby indicating that the IP address 116 of the router 114 is the home IP address.

Furthermore, the tracking module 131 performs the time-based analysis on the collected connection data across different users. Usage overlaps of the IP address 116 during a time period and a non-usage during a time gap are identified. For the overlapping usage, the device identifiers are used to identify the devices and associate these devices with the same router identifier (e.g., to identify the devices 112A-112K and associate them with the router identifier 134 in the profile 132 and, thereby, attributing online activities of these devices 112A-112K to the network 110). The non-usage indicates that the IP address 116 was re-allocated to another router and, thus, device identifiers identified for connections established after the time gap are not associated with the network 110 (e.g., with the router identifier 134 in the profile 133).

The customization module 135 detects online sessions between the devices 112A-112K and online resources and, in response, customizes 138 the online sessions (and similarly, customizes 139 online sessions of the other device 122 of the second user 120). Customization includes providing targeted content for presentation at the devices 112A-112K during the online sessions. For example, if the device 112A accesses a website, the targeted content can be inserted in that website or in another website subsequently accessed by the device 112A. The targeted content is generally content that is customized based on previous online activities of the devices 112A-112K and that is applicable to the devices 112A-112K.

As illustrated, the customization module 135 receives information from the tracking module 131 about a current connection of a device with an online resource. This connection can represent an online session 136. The customization module 135 also receives a router ID from the tracking module 131 (e.g., the router identifier 134). Given this ID, the customization module 135 accesses a profile for the corresponding user (this profile may be the same or may be stored separately from the profile maintained by the tracking module 132). The profile describes a history of targeted content provided to the network 110 and the available targeted content 137. The customization module 135 the selects one of the available targeted content 137 and provides this selected content in the online session 135, thereby providing a customized online session 138 to the device.

Although FIG. 1 illustrates a user operating multiple user devices to access online networks via a router, multiple users can do the same via the router. As further illustrated in FIG. 2, the router may provide a subnetwork to these user devices (e.g., which can be referred to as a home network). In an example, the subnetwork is located within a house and the users may be residents of the house. In the interest of clarity of explanation, embodiments of the present disclosure are described in connection with associating user devices of a user with a router and network (e.g., via a router identifier). However, the embodiments are not limited as such and similarly apply to associating all user devices of the router's subnetwork with the router and its router identifier (e.g., all devices using the same home network would be associated with the router identifier). Hence, associating devices of a user with a router identifier can also refer to or be similarly applicable to associating devices of a set of users with the router identifier (e.g., the user refers to a set of users), where these devices use the subnetwork of the router as their home network.

Certain embodiments, as illustrated in FIG. 1 and other figures, address the mistaken "single network attribution" described above by determining which user devices, from a set of user devices that share a particular IP address over time period, should actually be associated with a home network. For instance, a subset of these devices that access online resources via the same router in an overlapping times are associated with a particular home network. A router identifier, which includes both the particular IP address and another identifier specific to the router, is assigned to this subset of devices and used to attribute online activities by these devices to the particular home network.

In one example of these embodiments, a first user operates a first set of devices (e.g., a desktop computer, a smartphone, a tablet, etc.) to access online resources (e.g., websites, servers, etc.) via a first router of a first network. Similarly, a second user operates a second set of devices to access the online resources via a second router of a second network. Because routers are used, the IP addresses of the devices actually correspond to the addresses of the routers. Because DHCP reallocates IP addresses over time, the first router may be allocated an IP address for a first time period (e.g., January through March), and the second router may be allocated that same IP address for a second time period (e.g., May through September). Hence, the connection data tracked for the two users shows the first set of devices using the IP address for the first time period and the second set of devices using that same IP address for the second time period, when in fact these two sets of devices are for two different users. To accurately associate the first set of devices with the first network and the second set of devices with the second network, the IP-based tracking of the present disclosure performs a time-based analysis on the connection data. Based on this analysis, the devices in the first set have an overlapping use of the IP address during the first time period and, accordingly, are associated with an identifier of the first router.

For instance, between January and March, the connection data shows that the IP address was continuously used by the first set of devices, where "continuity" is relative to a predefined time resolution, such as a day. In other words, the first set of devices continuously used the IP address, where any non-use of the IP address was less than the predefined time resolution (e.g., less than a day). In comparison, between March and May, there was a time gap larger than the predefined time resolution (e.g., a month compared to a day), during which the IP address was not used. After that time gap, the connection data shows that the IP address was reused by the second set of devices. Accordingly, the IP-based tracking associates the first set of devices with the first router based on the overlapping use of the IP address in the first time period and the non-use of the IP address during the time gap, thereby indicating that these devices are used by user(s) accessing online resources via the first router of the first network. Likewise, the IP-based tracking associates the second set of the devices with the second router based on the overlapping use of the IP address in the second time period and the non-use of the IP address during the time gap.

In an example, associating the first set of devices with the first router includes generating an identifier unique to the first router and associating each of the devices in the first set with that identifier. For instance, the identifier includes the IP address and appends to it a string indicating that the first router is used by the first set (e.g., the identifier is "56.70.23.12-router-1," where "56.70.23.12" is the IP address and "router-1" is a synthetic name of the first router). Likewise, the second set is associated with a second identifier for the second router (e.g., "56.70.23.12-router-2," where the IP address stays the same and the string changes to include a different synthetic name for the second router).

Thereafter, the online activities of the first set of devices are tracked using the first router identifier (e.g., "56.70.23.12-router-1"), whereas the online activities of the second set of devices are tracked using the second router identifier (e.g., "56.70.23.12-router-2"). Hence, despite that these two sets of devices use the same IP address (e.g., "56.70.23.12") during the overall time period of January through September, the online activities of the devices is accurately tracked by using the router identifiers to differentiate the two device sets and the networks.

Figure 2:
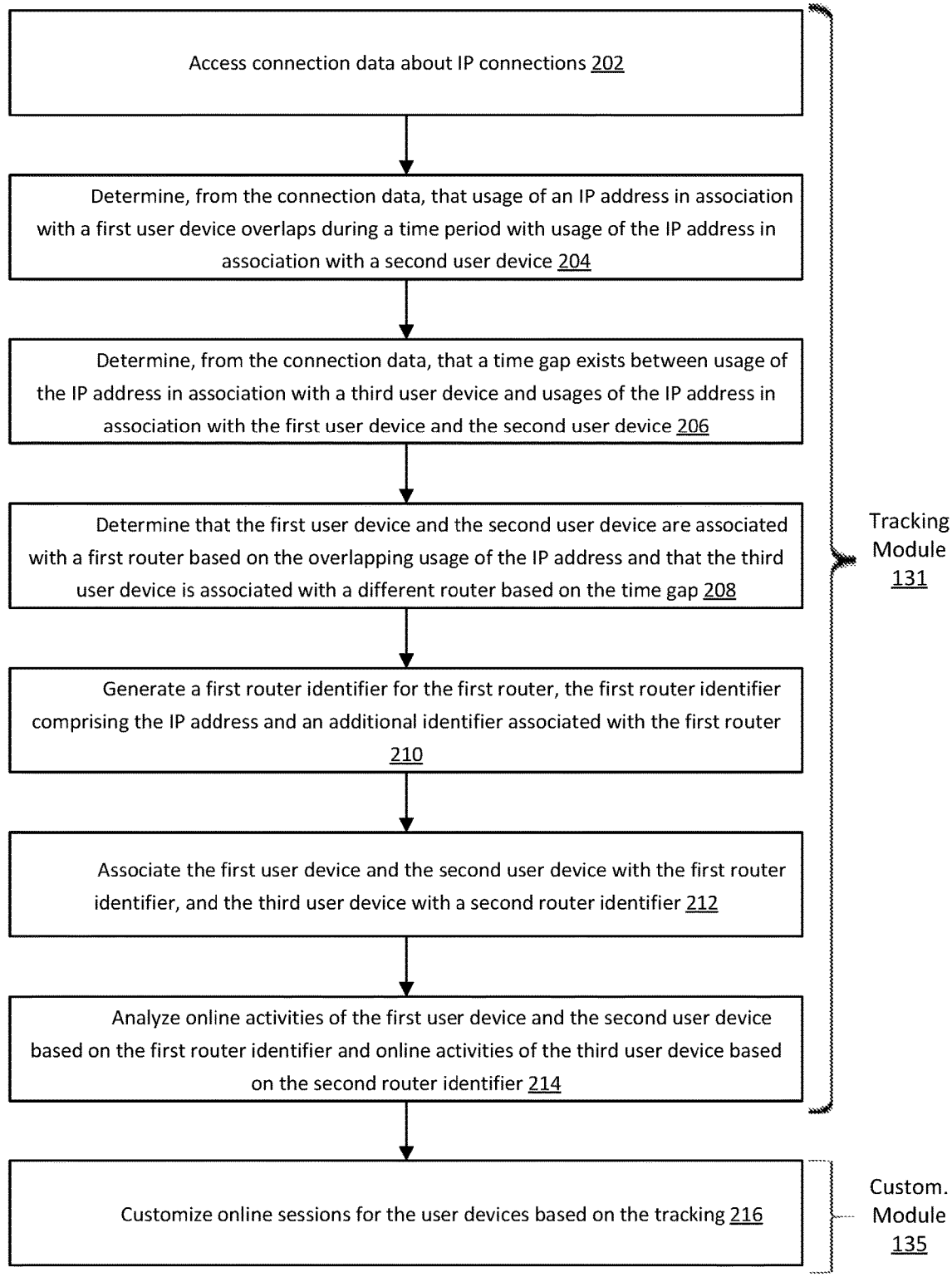
FIG. 2 illustrates an example of a flow for IP-based tracking within computer networks that use DHCP, according to embodiments of the present disclosure.

FIG. 2 illustrates an example of a flow for IP-based tracking within computer networks that use DHCP, according to embodiments of the present disclosure. A processing device is illustrated as implementing the operations of the example flow. In an example, the processing device represents a computer system hosting the tracking module 131 and the customization module 135 of FIG. 1. In this example, the various operations are performed by either the tracking module 131 or the customization module 135. For instance, operations 202-214 are performed by the tracking module 131 and operation 216 is performed by the customization module 135. Instructions for performing the operations of the illustrative flow can be stored as computer-readable instructions on a non-transitory computer-readable medium of the processing device. As stored, the instructions represent programmable a modules (e.g., the tracking module 131 and the customization module 135) that include code or data executable by a processor(s) of the processing device. The execution of such instructions configures the processing device to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

As illustrated, the example flow starts at operation 202, where the processing device accesses, from storage, connection data about IP connections. In an example, the connection data is generated from online activities of user devices, where these user devices connect to online resources via routers. The connection data associates an IP address over time with a first user device, a second user device, and a third user device (and, other user devices as applicable) (e.g., devices 112A-112K and 122 of FIG. 1). In an example, the first user device and the second user device use the IP address during a time period to access online resources via a first router of a first network (e.g., the router 114 and network 110 of FIG. 1). The IP address corresponds to the first router during the time period. For instance, an Internet service provider (e.g., a DHCP server) allocates the IP address to the first router based on a DHCP protocol to the router for that time period. The third user device uses the IP address after the time period based to access online resources via a second router of a second router (e.g., router 124 and network 120 of FIG. 1). For instance, after an elapse of the time period and subsequent to a time gap, the internet service provider re-allocates the IP address from the first router to the second router. The storage may be local or remote to the processing device. A collection service tracks the online activities of the user devices (e.g., access to online resources) to generate and store the connection data in the storage. Accordingly, the connection data indicates and the processing device determines that the IP address is used over different time periods by the first router and the second router.

At operation 204, the processing device determines, from the connection data, that usage of the IP address in association with the first user device overlaps during the time period with usage of the IP address in association with the second user device. For example, the processing device performs a time-based analysis of the connection data as illustrated in connection with FIG. 3. This analysis includes identifying overlapping usage during the time period, time gaps larger than a predefined time resolution where non-usage of the IP address is detected, subsequent overlapping usage. The connection data can show that two different devices (e.g., the first user device and the second user device) use the IP address across different overlapping time frames within the time period, where the connection data also associates the IP address with two unique device identifiers associated with the two devices respectively (e.g., cookies corresponding to browsers of the first and second user devices).

At operation 206, the processing device determines, from the connection data, that the time gap exists between usage of the IP address in association with the third user device (e.g., the usage of this IP address by the second router) and usages of the IP address in association with the first user device and the second user device (e.g., the usage of this IP address by the first router). In an example, this time gap is larger than the predefined time resolution (e.g., a threshold of one day). The connection data can show that the third device uses the IP address subsequent to the time gap, where the connection data also associates the IP address with a device identifier associated with the third device (e.g., a cookies corresponding to a browser of the third user device). Accordingly, the processing device determines that the time gap between usage of the IP address by the first router and usage of the IP address by the second router exceeds a threshold.

At operation 208, the processing device determines that the first user device and the second user device are associated with the first router (corresponding to a first home network) based on the overlapping usage of the IP address during the time period and that the third user device is associated with the second router (corresponding to a second home network) based on the time gap. For example, because of the overlapping usage during the time period followed by the non-usage in the time gap, the processing device follows an assumption that these two user devices are connected to the same first home network (e.g., a first subnetwork associated with the first router). Because the non-usage in the time gap is larger than the predefined time resolution and because this non-usage is followed by a usage of the third user device that does not have an overlapping usage in the previous time period, the processing device follows another assumption that the third user device is connected to a second home network (e.g., a second subnetwork associated with the second router). The assumptions can be performed based on a set of rules that specify the assumptions according to the overlapping usage and non-usage of the IP address.

At operation 210, the processing device generates a first router identifier for the first router. The router identifier includes the IP address and an additional identifier associated with the first router. In an example, this additional identifier included in the first router identifier includes a string indicating that the first router is used by the first user device and the second user device. For example, the first router identifier is "56.70.23.12-router-1," where "56.70.23.12" is the IP address and "router-1" is a synthetic name of the first router. Generally, the additional identifier (e.g., the string) is different from the cookies of the first user and second user devices. Similarly, the processing device generates a second router identifier for the second router.

At operation 212, the processing device associates the first user device and the second user device with the third router and the third user device with the second router identifier. For example, the processing device accesses a profile of with the first user (or, similarly, a profile the first network). That profile includes identifiers of the first and second user devices. The processing device adds the first router identifier to the profile, thereby associating the first and second user devices with this router identifier. The processions device similarly associates the third user device with the second router identifier based on a profile of the second user (or, similarly, a profile of the second network). Accordingly, the processing device attributes, based on the time gap and the overlapping usage, a subset of online activities originating from the first network to the first router identifier rather than the second router identifier.

At operation 214, the processing device analyzes online activities of the first user device and the second user device based on the first router identifier. For example, during the time period when the first two user devices use the IP address, the corresponding connection data is associated with the first router identifier. The online activities during that time period is tracked according to the first router identifier such that these online activities could be assumed to be originating from the same network (e.g., the first subnetwork). The processions device similarly tracks online activities of the third user device based on the second router identifier.

At operation 216, the processing device customizes online sessions for the user devices based on the tracking. For example and for the first and second user devices, the profile of the first user (or first network) can store available targeted content, a history of targeted content, and rules for selecting targeted content from the available ones based on the history. The selected targeted content is then provided to the first and second user devices during online sessions of these devices.

Figure 3:
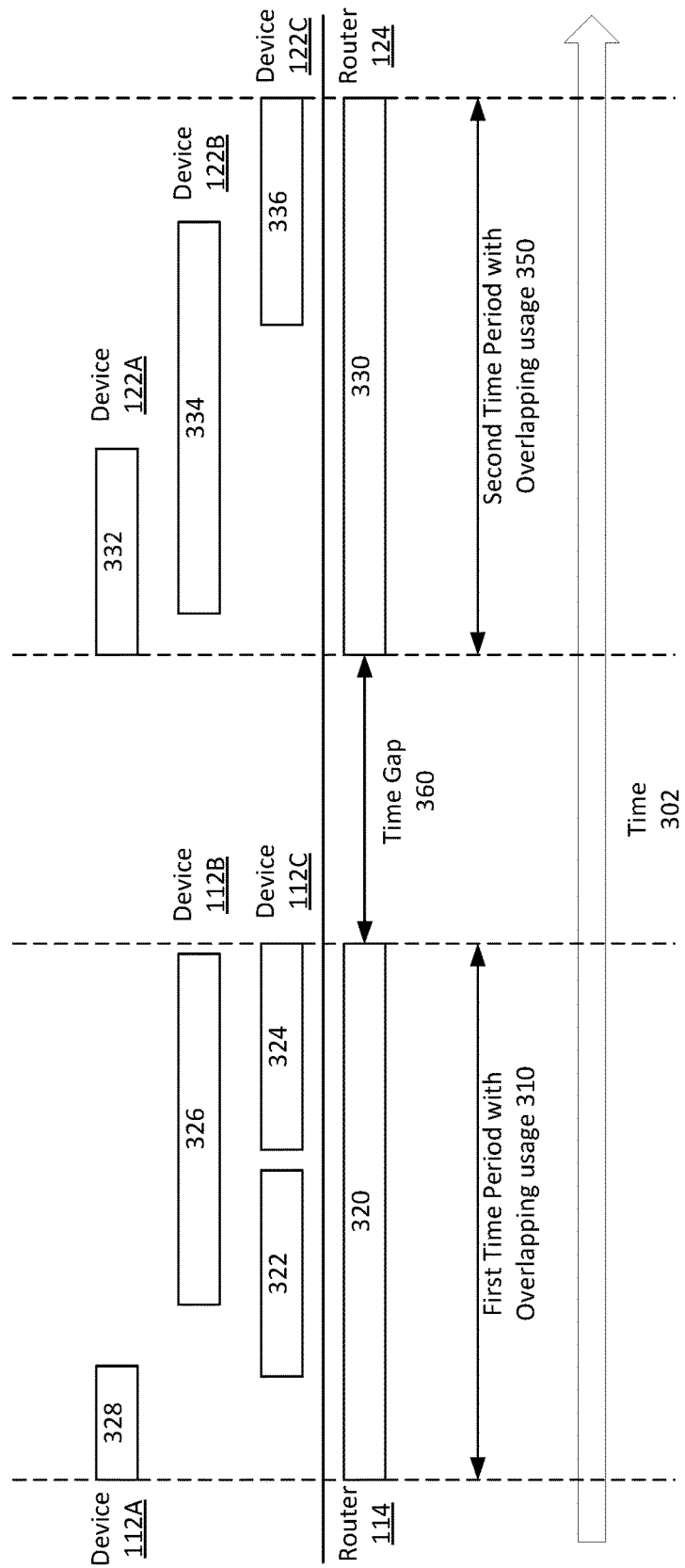
FIG. 3 represents an example of a time-based analysis of connection data to determine that multiple devices are connected to the same router and associated with the same IP address and user, according to embodiments of the present disclosure.

FIG. 3 represents an example of a time-based analysis of connection data 300 to determine that multiple devices are connected to the same router and associated with the same IP address and network, according to embodiments of the present disclosure. In this example, the devices 112A, 112B, and 112C are connected to the router 114, which has been assigned an IP address (e.g., "IP1") for a first time period 310, while the devices 122A, 122B, and 122C are connected to the router 124 which was subsequently assigned the same IP address (e.g., "IP1") during a second time period 350. A time gap 360 exists between the first time period 310 and the second time period.

As illustrated, the device 112A conducts online activity during time frame 328, the device 112B conducts online activity during time frame 326, and the device 112C conducts online during time frames 322 and 324. In each case, the connection analysis platform 130 collects connection data associated with the IP address and the devices. The times frames 322-328 fall within the first time period 310. The analysis of these time frames indicate that the IP address was continuously used by the devices 112A, 112B, and 112C, where the continuity is relative to a predefined time resolution, such as a day. In other words, the devices 112A, 112B, and 112C continued to use the IP address and any non-use of the IP address by these devices 112A, 112B, and 112C was less than the predefined time resolution. Hence, the connection data 300 for the first time period 310 shows overlapping use of the IP address by the devices 112A, 112B, and 112C and any non-use was shorter than the predefined time resolution.

After the end of the first time period 310, the time gap 360 occurs (e.g., a time period longer than the predefined time resolutions), during which there is no online activity associated with the IP address. In other words, the connection data 300 shows a non-use of the IP address during that time gap 360.

Following the time gap 360, the second time period 350 commences. During this time period 360, the device 122A conducts online activity using the IP address during time frame 332, the device 122B conducts online activity also using the IP address during time frame 334, and the device 122C conducts online activity also using the IP address during time frame 336. Hence, the connection data 300 for the second time period 350 shows overlapping use of the IP address by the devices 122A, 122B, and 122C and any non-use was shorter than the predefined time resolution.

Based on the overlapping use of the IP address by the devices 112A, 112B, and 112C in the first time period 310 and the non-use of the IP address by any device in the time gap 360, the devices 112A, 112B, and 112C are determined to be associated with a network (e.g., belonging to a same subnetwork managed by the router 114). Thus, a router identifier is generated to track the online activities of these devices 112A, 112B, and 112C. In an example, the router identifier includes the IP address and a string that indicates that these devices 112A, 112B, and 112C were connected to the same router 114 (e.g., the router identifier is "56.70.23.12-router-1," where "56.70.23.12" is the IP address and "router-1" is a synthetic name of the first router 114).

Similarly, based on the overlapping use of the IP address by the devices 122A, 122B, and 122C in the second time period 350 and the non-use of the IP address by any device in the time gap 360, the devices 122A, 122B, and 122C are determined to be associated with a different network (e.g., belonging to a different subnetwork managed by the router 124). Thus, a different router identifier is generated to track the online activities of these devices 122A, 122B, and 122C. In an example, the router identifier includes the IP address and a different string that indicates that these devices 122A, 122B, and 122C were connected to the other router 124 (e.g., the router identifier is "56.70.23.12-router-2," where "56.70.23.12" is the IP address and "router-2" is a synthetic name of the other router 124).

Figure 4:
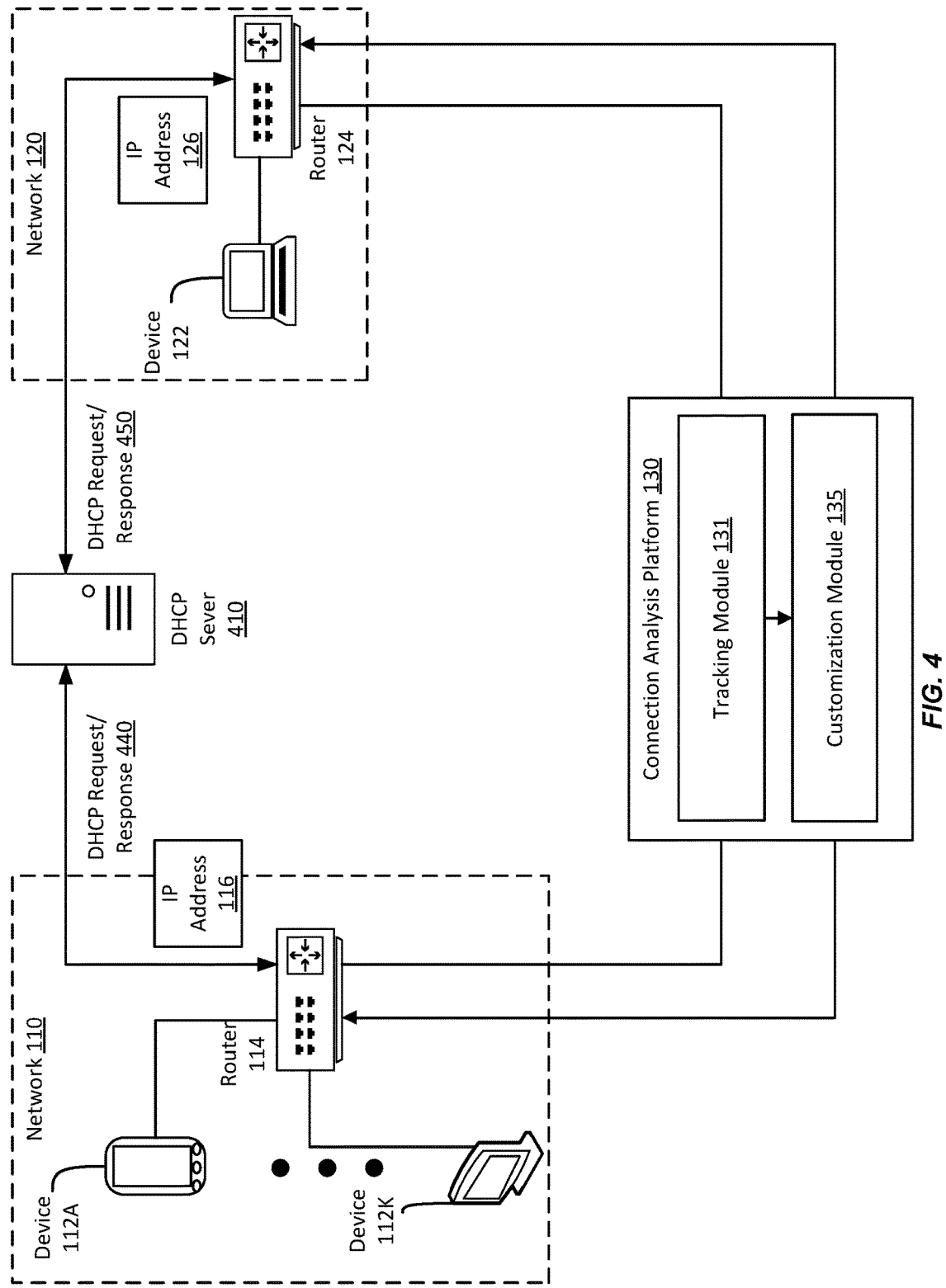
FIG. 4 is a diagram depicting an example of a network topology with multiple routers sharing an IP address, according to embodiments of the present disclosure.

FIG. 4 is a diagram depicting an example of a network topology in which multiple the routers 114 and 124 are connected to and are assigned IP addresses by the same DHCP server 410. As an example, the first router 114 manages a subnetwork (e.g., network 110) that includes devices 112A-112K connected to the first router 114. This subnetwork represent a home network of the user. The first router 114 gets an IP address 116 (e.g., "IP1" such as "56.70.23.12") assigned through a DHCP request and response 440 from the DHCP server 410. Within the subnetwork, the first router 114 assigns a local IP address to each of the devices 112A-112K. IP traffic within the subnetwork uses the local IP addresses. IP traffic leaving the subnetwork through the first router 114 uses the IP address 116. In other words, the router 114 masks the local IP addresses of the devices 112A-112K from online resources outside the subnetwork and instead, translates the local IP addresses to and from the IP address 116. In addition, each of the devices 112A-112K stores one or more cookies. The cookies may be part of the connection data 118 associated with the access of the devices 112A-112K to the online resources and may help further identify the devices 112A-112K.

Similarly, the second router 124 manages a second subnetwork (e.g., the network 120), where this subnetwork includes a second set of devices, such as the device 122.

When the DHCP lease expires for the first router 114, the first router 114 sends a new DHCP request to the DHCP server 410 and, in response, the DHCP server 410 can allocate a different IP address 116 to the first router 114. Hence, the IP address 116 changes over time (e.g., from "IP1" to "IP2" such as from "56.70.23.12" to "64.25.32.10.") The previously allocated IP address 116 (e.g., "IP1") can be re-allocated to the second router 124. Accordingly, IP traffic of the second set of devices (e.g., the device 112) can be detected as having the previous address of the first router 114 (e.g., "IP1").

Figure 5:
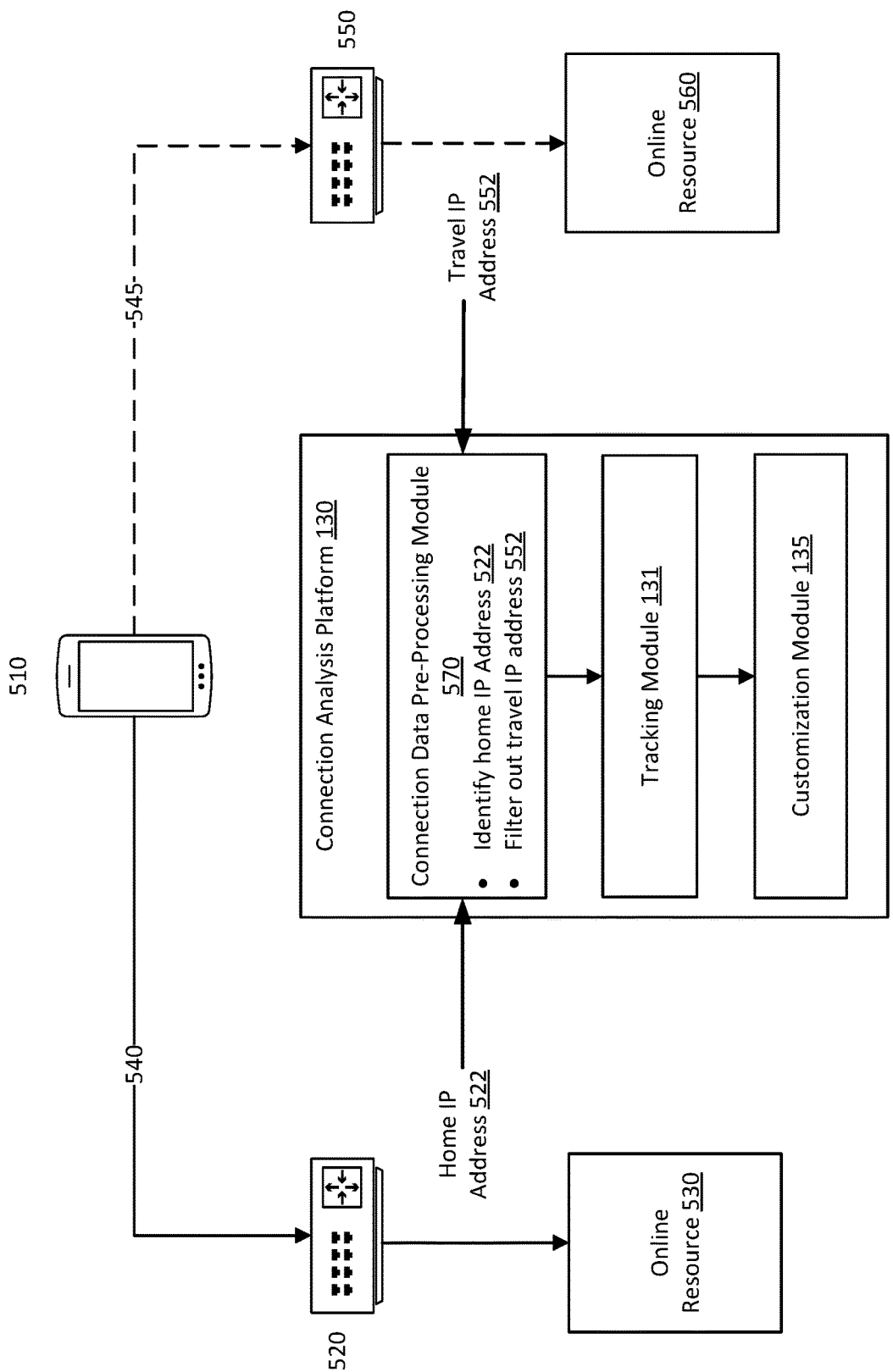
FIG. 5 illustrates an example of determining a home IP address for a device based on the device accessing different networks and using different IP addresses, according to embodiments of the present disclosure.

FIG. 5 illustrates an example of determining a home IP address for a device 510 (e.g., one of the device 112A-112K of FIG. 1) based on the device accessing different networks and using different IP addresses, according to embodiments of the present disclosure. As illustrated, during a first time period, the device 510 accesses an online resource 530 through a router 520 (e.g., the router 114). Subsequently, the user may move to a different geographic location and operates the device 510 to access the same or a different online resource 560 through a different router 550 (e.g., the router 124 or some other router). Accordingly, the connection data of the device 510 shows that the device is associated with two IP addresses (e.g., "IP1" corresponding to the router 520 and "IP2" corresponding to the second router 550). One of these routers (e.g., the router 520) manages the home network of the user. Accordingly, the question is which of these two IP addresses is the home IP address 522 of the device, and which of the two IP addresses is not the home IP address (shown as a travel IP address 552).

To answer the question, various connection parameters are used to analyze the connection data of the device 510. These parameters include, for example, a number of times each IP address is used to access the online resources 530 and 560, a number of connection sessions during which each IP address is used (e.g., how many times the online resources 530 and 560 were accessed and the used IP address), a length of a span during which each IP address is used (the time duration of each access), and a usage pattern for each IP address. Connection scores can be generated for each IP address from the connection data given these parameters. The IP address having the highest score is selected as the home IP address 522. Generally, the more frequently an IP address is used, the longer the use, and the more connection sessions during which it is used, the higher the score of that IP address is. Hence, by detection that "IP1" (the IP address of the first router 520) is more frequently used than IP2 (the IP address of the second router 550), the number of online connections made with IP1 is larger than that of IP2, and/or the online connections made with IP1 were longer than those made with IP2, the address of the first router 520 is scored higher and determined to be the home IP address 522.

In another example, if the usage pattern indicates that IP1 address is typically returned to after using other addresses (e.g. IP1→IP2→IP3→IP1), the address of the first router 520 determined to be the home IP address 522 and the other two addresses IP2 and IP3 are discarded. Filtering travel IP addresses can occur using different methods. For example, all IP addresses that are not in the same location as the connection with the highest score are filtered out. An IP address can be determined to be in the same location if the distance between the locations is lower than a predetermined threshold, which can account for slight inaccuracies in the IP-to-location dataset.

The home IP address 522 is the used to associate the device 510 and other ones using that home IP address 522 with the same user (as described in connection with FIGS. 1-4). In comparison, the different IP address 525 (e.g. "IP2") can be filtered out and removed from the time-based analysis described in connection with FIG. 3.

To do so, the connection analysis platform 130 hosts a connection data pre-processing module 570. In an example, the connection data pre-processing module 570 access the connection data of the device 510, identifies the used IP addresses 522 and 552, and generates a score and/or identifies a usage pattern for each of the IP addresses 522 and 552. Based on the scores and/or usage patterns, the connection data pre-processing module 570 identifies the home IP address from these addresses. The remaining IP addresses are assumed to be travel IP addresses. The connection data pre-processing module 570 filters out any connection data of the device 510 that is not associated with the home IP address 522, and forwards the remaining connection data (e.g., the one associated with the home IP address 522) to the tracking module 131 for further analysis. Accordingly, the tracking module 131 can associate the device 510 with a router on its home network (e.g., the router 520) based on analyzing the user of the home IP address 522 as described herein above in connection with FIGS. 1-4.

Certain embodiments, as illustrated in FIG. 5 and other figures, address the mistaken "device attribution" issue described above by identifying which IP address from multiple IP addresses used by a device is the device's home IP address and by filtering out the remaining IP addresses. The home IP address refers to the address on the home network of the device. Once the home IP address is identified, the device is associated with the router of the home network (e.g., with a router identifier) and the router identifier is used to track the online activities of the device. The process of using the home IP address and filtering out the remaining IP address avoids the potential for incorrectly assuming that multiple devices are being operated and generating multiple device to router associations, when in fact it is a single device using multiple IP addresses.

In one example of these embodiments, q user may regularly use a device from the first set of devices. His or her use may include traveling with the device to different geographic locations and accessing the online resources through different routers of computer networks at these locations. Hence, the connection data of the device shows that the device is associated with multiple IP addresses (e.g., the IP addresses of the different routers). However, only one of the networks may be a home network of the user. Rather than incorrectly assuming that multiple devices correspond to the IP address and associating such devices with different router identifiers, the IP address of that home network is identified and its corresponding connection data is used to generate an association between the device and the router on the home network. Any other IP address and the corresponding connection data are filtered out. As a result, the device is associated with a single router identifier (e.g., the identifier of the router on its home network). Thereafter, the online activities of the device are tracked based on this router identifier.

To identify the home IP address of the device, various connection parameters are used in the analysis of the connection data. These parameters include, for example, a number of times each IP address is used to access the online resources, a number of connection sessions during which each IP address is used, a length of a span during which each IP address is used, and a usage pattern for each IP address. Connection scores can be generated for each IP address from the connection data given these parameters. The IP address having the highest score is selected as the home address. Generally, the more frequently an IP address is used, the longer the use, and the more connection sessions during which it is used, the higher the score of that IP address is.

Figure 6:
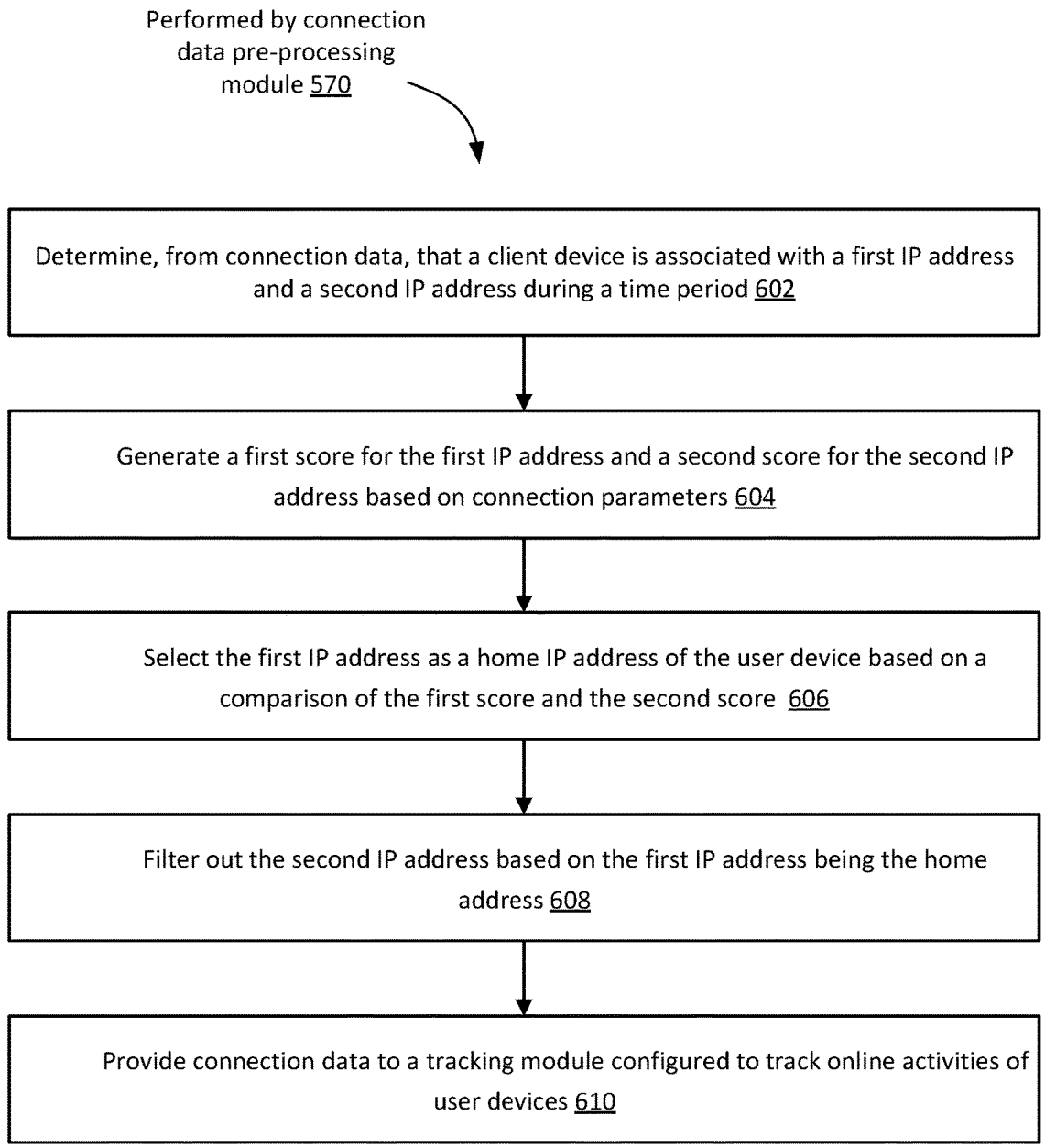
FIG. 6 illustrates an example of a flow for IP-based tracking to determine a home IP address of a device that may connect to different routers of different computer networks over time, according to embodiments of the present disclosure.
Figure 7:
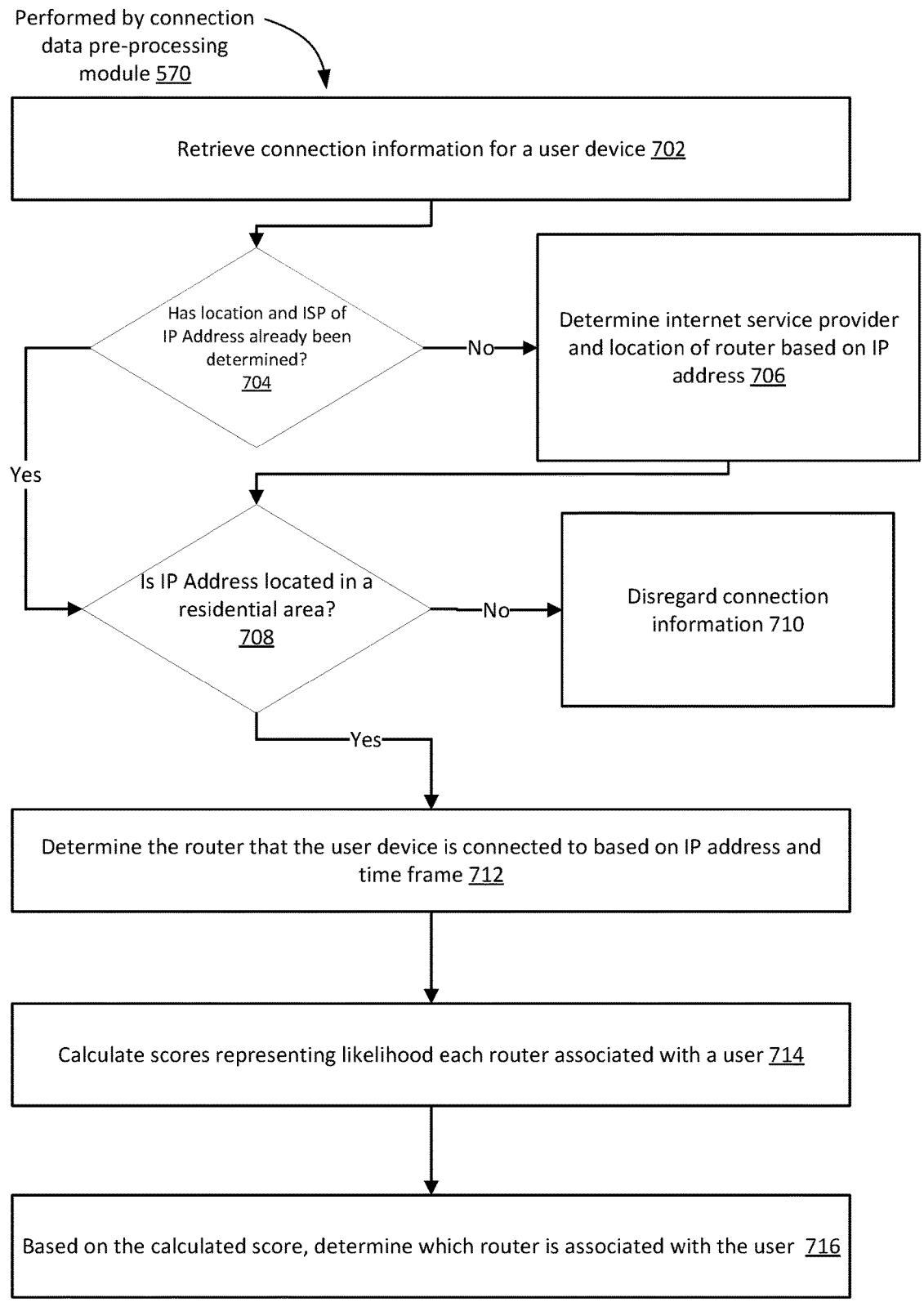
FIG. 7 illustrates an example of a flow for determining whether the connection data of a user device represents the user's home network, according to embodiments of the present disclosure.

FIGS. 6-7 illustrate example flows for IP-based tracking according to embodiments of the present disclosure. A processing device is illustrated as implementing the operations of the example flows. In an example, the processing device represents a computer system hosting the connection data pre-processing module 570 of FIG. 5. In this example, the various operations are performed by the connection data pre-processing module 570. Instructions for performing the operations of the illustrative flows can be stored as computer-readable instructions on a non-transitory computer-readable medium of the processing device. As stored, the instructions represent programmable a module(s) (e.g., the connection data pre-processing module 570) that include code or data executable by a processor(s) of the processing device. The execution of such instructions configures the processing device to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered. Further, some of the operations are similar between the flows. In the interest of brevity, the similarities are not repeated.

FIG. 6 illustrates an example of a flow for IP-based tracking to determine a home IP address of a device that may connect to different routers of different computer networks over time, according to embodiments of the present disclosure. This example flow may be performed in support of the example flow of FIG. 2. In particular, any IP address analyzed from the connection data in FIG. 2 is a home IP address. Because the same user device may use multiple IP addresses depending on its network connections, the example flow of FIG. 6 is performed to identify the home IP address out of these addresses.

As illustrated, the example flow starts at operation 602, where the processing device determines, from the connection data, that a user device is associated with a first IP address and a second IP address during a time period (and, with other IP addresses as applicable). The user device may be the first user device described in connection with the example flow of FIG. 2. This time period may be the same time period discussed in connection with operation 208. The first IP address corresponds to a first router to which the user device connects to during a first time frame within the time period. The second IP address corresponds to a second router to which the user device connects to during a second time frame within the time period. Generally, the processing device accesses the connection data from memory. The connection data indicates that a user device identifier is associated with the first IP address of the first router and that the user device identifier is associated with the second IP address of the second router. The user device identifier is an identifier that can uniquely identify the user device, such as its MAC address.

At operation 604, the processing device generates a first score for the IP address and a second score for the second IP address based on usages, over time, of the first IP address and the second IP address. For instance, the usages are analyzed according to connection parameters. In an example, the connection parameters include a number of times each IP address is used to access online resources, a number of connection sessions during which each IP address is used, and a length of a span during which each IP address is used. In a further example, the connection parameters include a usage pattern for each IP address. The processing device accesses a rule for weighing these different connection parameters and generating the scores. For instance, the rule specifies that the first IP address should be allocated a relatively higher score (thereby, setting it as the home IP address) based on the usage pattern indicating that first IP address is more frequently used than the second IP address by the user device. The rule may also specify that the other connection parameters should be weighed equally and that, generally, the longer the first IP is used or the more online sessions it is found in, the larger its score should be.

At operation 606, the processing device selects the first IP address as a home IP address of the user device based on a comparison of the first score and the second score. For example, the processing device sets the first IP address as the home IP address and stores an indication of this setting in a profile associated with the user device based on the first IP address having a higher score. As explained herein above, this first IP address is used to compare its usage by the user device with its usages by other user devices based on the IP address being the home IP address. The second IP address is determined to be a travel IP address. Accordingly, the processing device assigns, based on a comparison of the first score and the second score, the first IP address as the home IP address for the user device identifier.

At operation 608, the processing device filters out the second IP address (and any other travel IP address) based on the first IP address being set as the home IP address. Accordingly, this second IP address is no longer used in the time-based analysis of the connection data under the example flow of FIG. 2.

At operation 610, the processing device provides connection data to a tracking module configured to track online activities of user devices. For example, the processing device filters out any connection data associated with a travel IP address, such that the remaining connection data is for connections where the home IP address is used. This remaining connection data is outputted to the tracking module.

By performing operations 608 and 610, the processing device analyzes first online activities originating from the first IP address and including the user device identifier and second online activities originating from the second IP address and lacking the user device identifier (e.g., based on the filtering of operation 608). The analysis of the second online activities includes excluding, based on the first IP address being assigned as the home IP address for the user device identifier, online activities associated with the user device identifier.

FIG. 7 illustrates an example of a flow for determining whether the connection data of a user represents the user's home network, according to embodiments of the present disclosure. The example flow starts at operation 702, where the processing device accesses the connection data.

At operation 704, the processing device determines whether the geographic location and ISP for the IP address in the connection data has already been determined. This can be done by checking to see if there is an existing determination from storage. In an example, existing determinations for the location and the ISP information are accessed from memory local to the processing device. In another example, existing determinations are accessed from a database. In yet another example, existing determinations are accessed over a network connection.

If a determination has not been made, operation 706 is performed. At operation 706, the processing device determines the location and ISP associated with the IP address. As an example, the processing device queries a Regional Internet Registry (ARIN) to retrieve location and ISP information. In another example, the processing device may access a geolocation database containing the IP address location and ISP information. The geolocation database may be stored locally to the processing device, or may be accessed from a third party provider of geolocation services.

Once the location and ISP of an IP address has been determined, operation 708 is performed. At operation 708, the processing device determines whether the IP address corresponds to a residential location. As an example, the processing device may access a provider of Residential Delivery Indicator data to determine whether the location is in a residential location. In another example, a determination has already been made and the processing device retrieves the results of the previous determination. In an example, the previous determination is accessed from memory local to the processing device. In another example, the previous determination is accessed from a database. In yet another example, the previous determination is accessed over a network connection.

In some embodiments, the determination is made that the IP address does not correspond to a residential location. In this case, the connection information is disregarded in operation 710 and the flow ends. In other embodiments, the determination is that the IP address corresponds to a residential location, and operation 712 is performed. At operation 712, the processing device determines, from the connection data, a router that the user device is connected to, where this determination identifies the IP address and time frame. In some embodiments, this is done by determining what other users are conducting online activity due to overlapping time frames, the duration of the time frame, whether the time frame is recent, and the size of time gaps that may exist between the time frames associated with the user device at the IP address and the time frame of other users devices associated with the IP address.

In some embodiments, at operation 714, the processing device retrieves the location and ISP information from and the connection data to generate and update scores for determining which router should be associated with the user. In some embodiments, a new score is generated for each user device associated with the same router as the router identified in operation 712. In some embodiments, a new score is generated for each router associated with the user identified in the connection information collected in operation 702.

At operation 716, based on the new scores, the processing device performs a new or updated determination as to the router associated with the user for each user device that has a new or updated score. In an example, a new or updated determination is stored in memory local of the processing device. In another example, the previous determination is stored in a database. In yet another example, a new or updated determination is sent over a network connection.

Figure 8:
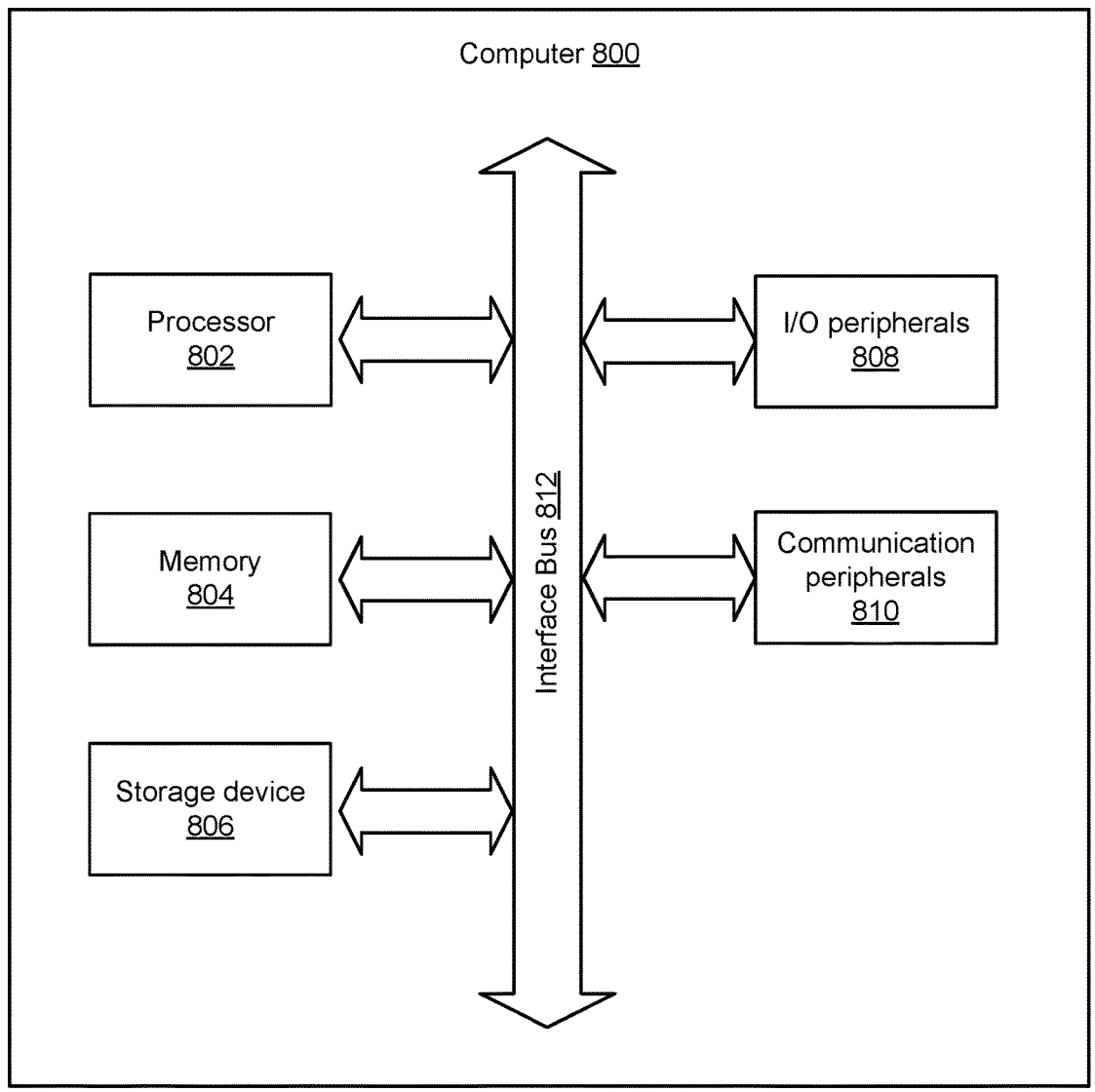
FIG. 8 illustrates examples of components of a processing device, according to embodiments of the present disclosure.

FIG. 8 illustrates examples of components of a processing device (illustrated as a computer 800), according to certain embodiments. The computer 800 includes at least a processor 802, a memory 804, a storage device 806, input/output peripherals (I/O) 808, communication peripherals 810, and an interface bus 812. The interface bus 812 is configured to communicate, transmit, and transfer data, controls, and commands among the various components of the computer 800. The memory 804 and the storage device 806 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 804 and the storage device 806 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computing system of, for example, a cloud network or a data center. The I/O peripherals 808 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 808 are connected to the processor 802 through any of the ports coupled to the interface bus 812. The communication peripherals 810 are configured to facilitate communication between the computer 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method for attributing online activities of user devices to different local area networks, wherein the method comprises operations performed by a computer system, the operations comprising:
   determining, from connection data generated based on an online activity from a plurality of user devices, that an internet protocol (IP) address is used, over different time periods, by a first router of a first network and a second router of a second network;
   determining that a time gap between a first usage of the IP address by the first router and a second usage of the IP address by the second router exceeds a threshold;
   attributing, to a first router identifier rather than to a second router identifier and based on the time gap, a subset of the online activity originating from one or more user devices on the first network, wherein the first router identifier comprises the IP address and wherein the second router is associated with the second router identifier; and
   analyzing the subset of the online activity based on the first router identifier.

2. The method in claim 1, wherein the operations further comprise:
   determining, based on the connection data, that the IP address is used by a first user device, a second user device, a third user device;
   determining that the first user device and the second user device use the first router to access online resources, the determining based on the first user device and the second user device having an overlapping usage of the IP address during a time period;
   determining that the third user devices uses the second router to access the online resources, the determining based on a time gap between (i) the second usage of the IP address, (ii) the first usage of the IP address by the first user device, and a third usage of the IP address by the third user device;
   associating the first user device and the second user device with the first router identifier to indicate that the first user device and the second user device belong to the first network; and
   associating the third user device with the second router identifier to indicate that the third user device belongs to the second network.

3. The method in claim 1, wherein the first router uses the IP address during a time period in association with access of user devices to online resources via the first router, and wherein an Internet service provider allocates the IP address to the first router based on a dynamic host configuration protocol (DHCP), and wherein the IP address is re-allocated after the time period by the Internet service provider from the first router to the second router.

4. The method in claim 1, wherein the first router identifier comprises an additional identifier that comprises a string indicating that the first router is used by the a user device of the first network, wherein the string distinguishes the first router from the second router.

5. The method of claim 1, wherein the operations further comprise:
   determining, from the connection data, that a user device is associated with the IP address and with a second IP address during a time period, the second IP address used by a third router of a third network;
   generating a first score for the IP address and a second score for the second IP address based on connection parameters; and
   selecting the IP address as a home IP address of the user device based on a comparison of the first score and the second score, wherein the selection indicates that first user device belongs to the first network and online activities of the user device should be attributed to the first network.

6. The method in claim 5, wherein the connection parameters comprise a number of times each IP address is used to access online resources, a number of connection sessions during which each IP address is used, and a length of a span during which each IP address is used.

7. The method in claim 5, wherein the operations further comprise:
   filtering out the second IP address based on the IP address being set as the home IP address.

8. The method in claim 5, wherein the connection parameters comprise a usage pattern for each IP address.

9. The method in claim 8, wherein the IP address is set as the home IP address based on the usage pattern indicating that IP address is more frequently used than the second IP address by the user device.

10. A system comprising:
    a processing device; and
    a non-transitory computer-readable medium communicatively coupled to the processing device, wherein the processing device is configured to execute program code stored in the non-transitory computer-readable medium and perform operations comprising:
       accessing connection data indicating that (i) a user device identifier is associated with a first internet protocol (IP) address of a first router and (ii) the user device identifier is associated with a second IP address of a second router;
       generating, from the connection data, a first score for the first IP address and a second score for the second IP address based on usages, over a period of time, of the first IP address and the second IP address, respectively;
       assigning, based on a comparison of the first score and the second score, the first IP address as a home IP address for the user device identifier;
       analyzing a plurality of first online activities originating from the first IP address and including the user device identifier; and analyzing a plurality of second online activities originating from the second IP address and lacking the user device identifier at least in part by excluding, based on the first IP address being assigned as the home IP address for the user device identifier, online activities associated with the user device identifier.

11. The system in claim 10, wherein the first score and the second score are generated from the connection data based on connection parameters, wherein the connection data indicates the usages, and wherein the connection parameters comprise at least one of: a number of times each IP address is used to access online resources, a number of connection sessions during which each IP address is used, and a length of a span during which each IP address is used.

12. The system in claim 11, wherein the first score and the second score are generated from connection data of the user device identifier based on a usage pattern of each IP address.

13. The system in claim 11, wherein the operations further comprise:
  setting the first IP address as a home IP address; and
  filtering out the second IP address based on the first IP address being set as the home IP address.

14. The system in claim 13, wherein analyzing the first online activities comprises:
  determining that the first IP address is used over time by a first user device and a second user device, wherein the first user device corresponds to the user device identifier, and wherein the second user device corresponds to another user device identifier;
  determining that the first user device is connected to the first router and that the second user device is connected to the second router based on a time gap between usage of the first IP address by the first user device and usage of the first IP address by the second user device; and
  associating the first user device with a first router identifier corresponding to the first router, wherein the first online activities are analyzed based on the first router identifier.

15. The system in claim 14, wherein the first router identifier comprises the first IP address and an additional identifier associated with the first router.

16. The system in claim 15, wherein the operations further comprise:
  associating the second user device with a second router identifier corresponding to the second router, wherein the second online activities are analyzed based on the second router identifier.

17. A non-transitory computer-readable medium having program code that is stored thereon, wherein the program code is executable by one or more processing devices for performing operations comprising:
  determining, from connection data generated based on online activities from a plurality of user devices, that an internet protocol (IP) address is used, over different time periods, by a first router of a first network and a second router of a second network;
  determining that a time gap between usage of the IP address by the first router and usage of the IP address by the second router exceeds a threshold;
  attributing, to a first router identifier rather than to a second router identifier and based on the time gap, a subset of the online activities originating from one or more user devices on the first network, wherein the first router identifier comprises the IP address, and wherein the second router is associated with a second router identifier corresponding to the second network; and
  analyzing the subset of the online activities based on the first router identifier.

18. The non-transitory computer-readable medium of claim 17, the operations further comprising:
  determining, from the connection data, that a user device is associated with the IP address and with a second IP address during a time period, the second IP address used by a third router of a third network;
  generating a first score for the IP address and a second score for the second IP address based on connection parameters; and
  selecting the IP address as a home IP address of the user device based on a comparison of the first score and the second score, wherein the selection indicates that first user device belongs to the first network and online activities of the user device should be attributed to the first network.

19. The non-transitory computer-readable medium of claim 18, wherein the connection parameters comprise a number of times each IP address is used to access online resources, a number of connection sessions during which each IP address is used, and a length of a span during which each IP address is used.

20. The non-transitory computer-readable medium of claim 17, wherein the first router identifier comprises an additional identifier that comprises a string indicating that the first router is used by the a user device of the first network, wherein the string distinguishes the first router from the second router.

* * * * *